Figure 1:
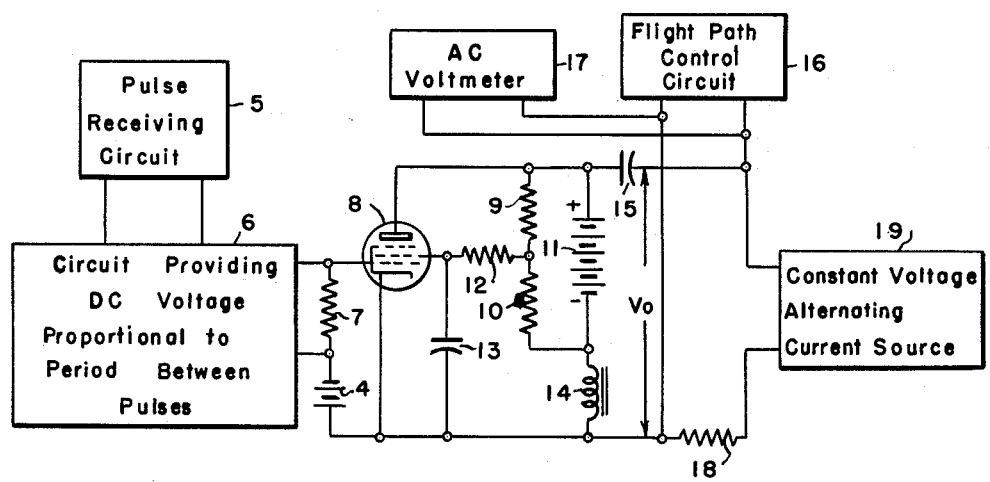

Jan. 17, 1956

R. HAUPTMAN 2,731,593

ELECTRICAL SYSTEM

Filed May 14, 1949

WITNESSES:

INVENTOR
Robert Hauptman.
BY
ATTORNEY

United States Patent Office 2,731,593
Patented Jan. 17, 1956

2,731,593

ELECTRICAL SYSTEM

Robert Hauptman, Baltimore, Md., assignor, by mesne assignments, to the United States of America as represented by the Secretary of the Navy Application May 14, 1949, Serial No. 93,289

2 Claims. (Cl. 323—30)

This invention relates to circuits in electrical systems for providing alternating current voltages which are inversely proportional to direct current voltages, and relates more particularly to circuits in radar systems for providing alternating current voltages which are inversely proportional to the direct current voltages derived from range computers, and which are proportional to range.

In a radar system for controlling the flight path of a guided missile, the instantaneous distance of the missile from its target, known as the "range," is indicated by the period between successive echo pulses, known as "range markers." Circuits which may be described as "range computer circuits" measure the periods between the range markers, and provide direct current voltages which are proportional to the range. This invention provides alternating current voltages which are inversely proportional to the direct current voltages from a range computer circuit, and which may be used in a control circuit for correcting for errors in the flight path of a guided missile.

In one embodiment of the invention, a pentode vacuum tube has its input circuit connected to the output of a range computer circuit which provides direct current voltages which are proportional to range, and has connected in its output circuit a voltage dividing network of which the plate resistance of the tube acts as a variable resistor, the value of which is inversely proportional to range, and which varies the voltage from a constant voltage alternating current source so that an alternating current voltage inversely proportional to range is provided.

Figure 2:
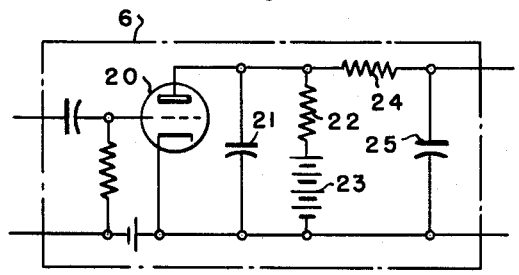

The invention will now be described with reference to the drawing, of which:

Figure 1 is a circuit schematic illustrating this invention embodied in a radar system, and Fig. 2 is a circuit schematic illustrating a circuit which may be used in the system of Fig. 1 for providing direct current voltages proportional to range.

The conventional pulse receiving circuit 5 of a radar system, has its output connected to the input of the circuit 6 which provides direct current voltages proportional to range, and a preferred form of which is illustrated by Fig. 2.

The direct current voltages from the circuit 6 are supplied across the grid resistor 7 to the control grid and the cathode of the pentode tube 8. The bias battery 4 is connected between the grid resistor 7 and the cathode of the tube. The plate of the tube is connected to the positive terminal of the "B" battery 11 which is connected through the series connected resistors 9 and 10 to the negative terminal of the battery. The screen grid of the tube is connected through the resistor 12 to the junction point of the resistors 9 and 10, and is connected through the capacitor 13 to the cathode of the tube. The negative terminal of the battery 11 is connected through the audio frequency choke 14 to the cathode of the tube.

The plate of the tube 8 is also connected through the blocking capacitor 15 to one side of the constant voltage source of alternating current 19, the other side of the source 19 being connected through the resistor 18 to the cathode of the tube 8.

The flight path control circuit 16 is connected to the side of the capacitor 15 which is connected to the source 19, and to the side of the resistor 18 which is connected to the cathode of the tube 8. The alternating current voltmeter 17 may be shunted across the circuit 16, and its scale may be calibrated to indicate range. The details of the flight path control circuit 16 are not shown since they form no part of this invention.

The resistors 9, 10, and 12 are selected to provide the proper voltage from the battery 11 to the screen grid of the tube 8. The capacitor 13 is a by-pass capacitor. The audio frequency choke 14 is for providing impedance to the flow of alternating current through the output circuit of the tube.

The circuit components of the tube 8 are so selected that it has a linear transconductance characteristic over its range of operation. Its control grid voltage supplied from the circuit 6 is proportional to range. Its anode current is proportional to its control grid voltage and is therefore proportional to range. Its plate resistance is inversely proportional to range. The source 19 provides through the capacitor 15 and the resistor 18, an alternating current which produces an alternating current voltage drop across the plate resistance of the tube, which is inversely proportional to range. This voltage drop is shown as $V_0$ on Fig. 1 of the drawing.

For true linear operation of the tube 8, the following conditions must be met:

$$V_0 = i_{p'} r_p = \frac{V_{in}}{r_p + R} r_p = \frac{V_{in}}{1 + R/r_p} = \frac{K}{S}$$

$$K = \frac{KR}{r_p} = SV_{in}$$

$$Kr_p + KR = SV_{in}.r_p$$

$$r_p = \frac{KR}{SV_{in} - K} = \frac{e_p}{i_p}$$

$$KRi_p = e_p(SV_{in} - K)$$

$$i_p = e_p \frac{(SV_{in} - K)}{KR} = f(S)$$

$$= e_p \frac{(C'E_g V_{in} - K')}{KR} = f(E_g)$$

where:

$V_0$=the alternating current voltage across the output circuit of the tube 8, and which is inversely proportional to range.

$V_{in}$=the alternating current voltage from the source 19.

$i_{p'}$=the component of the plate current due to the impressed voltage $V_{in}$.

$r_p$=the plate resistance at the operating point of the tube.

$R$=the value of the resistor 18.

$S$=the range.

$K$=a constant of proportionality=$V_0S$.

$e_p$=the direct current plate voltage.

$i_p$=the direct current plate current.

$E_g$=the direct current grid voltage determined by the bias battery 4, and the direct current voltage proportional to range from the circuit 6.

$E_{BB}$=the voltage of the "B" battery 11.

$E_{CC}$=the voltage of the bias battery 4.

$f$=the frequency of $V_{in}$ and $V_0$.

$C'$=the constant of proportionality between the direct current input voltage and the range and=

$$\frac{\Delta S}{\Delta E_g} = \frac{1}{C''}$$

$K'$=a constant including the effect of the bias voltage added to K.

$=C'E_{CC} V_{in} + K$ thus:

$$SV_{in}-K=C'E_gV_{in}-K'=\frac{\Delta S}{\Delta E_g}E_gV_{in}-K-\frac{\Delta S}{\Delta E_g}E_{cc}V_{in}$$

$$S=\frac{\Delta S}{\Delta E_g}E_g-\frac{\Delta S}{\Delta E_g}E_{cc}$$

$$E_g=E_{cc}+S\frac{\Delta E_g}{\Delta S}$$

The plate resistance $r_p$ and the resistor 18 form a voltage dividing network of which $r_p$ is a variable resistor, the resistance of which varies inversely with range with linear operation of the tube. For linear operation the minimum value of $r_p$ should be less than one-tenth the value of the resistor 18(R).

Fig. 2 illustrates a circuit 6 which may be used to provide direct voltages proportional to range to the input circuit of the tube 8. The gaseous triode 20 is connected in a saw-tooth relaxation oscillator circuit in which the tube is triggered by the signal pulses applied to its control grid, and which has in its plate circuit the capacitor 21 which is charged through the resistor 22 by the "B" battery 23. The plate of the tube is connected through the resistor 24 to one side of the output circuit of the oscillator, and the cathode of the tube is connected to the other side of its output circuit. The capacitor 25 is shunted across the output circuit.

The circuit components of the tube 20 are so chosen that the normal period for linear saw-tooth operation of the oscillator is greater than the maximum expected range, and that the period and amplitude of oscillations are proportional to the periods between the received pulses. The resistance of the resistor 24 is larger than that of the resistor 22, and the capacity of the capacitor 21 is larger than that of the capacitor 25 so that the time constant of the resistor 24 and the capacitor 25, is larger than that of the resistor 22 and the capacitor 21. Therefore, on the first cycle of operation the capacitor 25 charges to a lower voltage than the capacitor 21 which charges to the breakdown voltage of the tube 20. During the discharge portion of the first cycle, the capacitor 25 discharges through the resistor 24 but does not lose all of its charge. On the second cycle the capacitor 25 charges to a higher voltage than in the first cycle. This accumulation of charge in the capacitor 25 continues for several cycles until the charge and discharge in each complete cycle become equal. The capacitor 25 then has been charged to an average direct current value which is proportional to the period of the initiating saw-tooth voltage, which, in turn, is proportional to range.

I claim as my invention:

1. In an electrical system comprising means for producing varying direct current voltages, the combination of a vacuum tube having therein an anode, a cathode and a control grid, a source of direct current, a choke connected in series with said source, said serially connected source and choke being connected to the cathode and anode of the vacuum tube, connecting means for applying said varying direct current voltages to the control grid, a substantially constant voltage alternating current source, a resistor connected in series with said alternating current source, said serially connected alternating current source and resistor being connected to the cathode and anode of the vacuum tube in parallel with the direct current source and choke, whereby the alternating current voltage across the vacuum tube is a function of the varying direct current voltages applied to the control grid, and electrically actuated means responsive to the alternating current potential across said vacuum tube and connected thereto.

2. The electrical system as defined in claim 1, in which the vacuum tube is a pentode and the resistance of said resistor is approximately ten times the plate resistance of the vacuum tube.

References Cited in the file of this patent

UNITED STATES PATENTS

| | | |
|---|---|---|
| 1,668,711 | Evans | May 8, 1928 |
| 2,169,093 | Edwards | Aug. 8, 1939 |
| 2,253,307 | Richter | Aug. 19, 1941 |
| 2,266,401 | Reeves | Dec. 16, 1941 |
| 2,301,196 | Bradford | Nov. 10, 1942 |
| 2,474,580 | Hiehle | June 28, 1949 |